United States Patent
Kovacic et al.

(10) Patent No.: US 8,313,233 B2
(45) Date of Patent: Nov. 20, 2012

(54) KITCHEN APPLIANCE PROVIDED WITH A REINFORCED ELECTRIC MOTOR-GEAR STAGE ARRANGEMENT AND METHOD FOR PRODUCING AN ELECTRIC MOTOR-DRIVEN KITCHEN APPLIANCE

(75) Inventors: Peter Kovacic, Gomilsko (SI); Jurij Pesec, Slowenien (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 933 days.

(21) Appl. No.: 11/991,020

(22) PCT Filed: Aug. 16, 2006

(86) PCT No.: PCT/EP2006/065360
§ 371 (c)(1),
(2), (4) Date: Feb. 25, 2008

(87) PCT Pub. No.: WO2007/023123
PCT Pub. Date: Mar. 1, 2007

(65) Prior Publication Data
US 2009/0147618 A1    Jun. 11, 2009

(30) Foreign Application Priority Data
Aug. 26, 2005    (DE) .................. 10 2005 040 544

(51) Int. Cl.
*B01F 7/30*    (2006.01)
(52) U.S. Cl. ....................... 366/197; 366/287
(58) Field of Classification Search ........... 366/197, 366/287, 288
See application file for complete search history.

(56) References Cited

U.S. PATENT DOCUMENTS

| | | | | |
|---|---|---|---|---|
| 1,387,908 A | * | 8/1921 | Riedel | 366/162.2 |
| 1,399,080 A | * | 12/1921 | Ross | 366/197 |
| 1,464,567 A | * | 8/1923 | French | 366/185 |
| 1,571,655 A | * | 2/1926 | Ashley | 366/197 |
| 1,604,242 A | * | 10/1926 | Smedberg | 366/288 |
| 1,723,009 A | * | 8/1929 | Brackett | 144/28.5 |
| 1,781,321 A | * | 11/1930 | Dehuff | 474/31 |
| 1,812,450 A | * | 6/1931 | Sackett | 366/192 |
| 1,862,181 A | * | 6/1932 | Emmons | 366/197 |
| 1,864,304 A | * | 6/1932 | Hoe | 74/16 |
| 1,891,925 A | * | 12/1932 | Hackett | 74/16 |
| 1,910,162 A | * | 5/1933 | Hoe | 366/197 |
| 1,914,807 A | * | 6/1933 | Jackman | 366/277 |
| 1,952,433 A | * | 3/1934 | Halstead | 99/427 |
| 2,007,729 A | * | 7/1935 | Shallcross | 118/221 |
| 2,025,685 A | * | 12/1935 | Hunter | 392/441 |
| 2,040,016 A | * | 5/1936 | Sanders | 475/11 |

(Continued)

OTHER PUBLICATIONS

International Search Report PCT/EP2006/065360.

*Primary Examiner* — David Sorkin
(74) *Attorney, Agent, or Firm* — James E. Howard; Andre Pallapies

(57) ABSTRACT

An electric motor-driven kitchen appliance includes an electric motor having a motor housing and a gear stage having a gear case fastened to the electric motor. A removable reinforcement frame is around the motor housing and gear case. The electric motor-gear stage arrangement can be tested outside of the housing of the kitchen appliance and produced in a cost effective manner, being particularly torsionally rigid due to the removable reinforcement frame, thereby exhibiting an operation reliability.

31 Claims, 11 Drawing Sheets

U.S. PATENT DOCUMENTS

| | | | | |
|---|---|---|---|---|
| 2,061,868 A | * | 11/1936 | Fitzgerald | 366/201 |
| 2,075,840 A | | 4/1937 | Van Deventer et al. | |
| 2,160,388 A | * | 5/1939 | Morse | 99/503 |
| 2,251,903 A | * | 8/1941 | Anstice et al. | 366/185 |
| 2,960,946 A | * | 11/1960 | Lutz et al. | 112/11 |
| 3,338,562 A | * | 8/1967 | Fox | 366/287 |
| 3,656,016 A | | 4/1972 | Jacyno et al. | |
| 3,677,100 A | * | 7/1972 | Kajiwara | 475/11 |
| 4,057,226 A | * | 11/1977 | de Mos et al. | 366/244 |
| 4,065,811 A | * | 12/1977 | Pauty | 366/244 |
| 4,079,917 A | * | 3/1978 | Popeil | 366/244 |
| 4,131,034 A | | 12/1978 | Rolf | |
| 4,198,373 A | * | 4/1980 | Kropp et al. | 422/49 |
| 4,666,676 A | * | 5/1987 | Nelson et al. | 422/149 |
| 4,813,785 A | * | 3/1989 | Miller | 366/251 |
| 4,856,910 A | * | 8/1989 | Cuschera | 366/282 |
| 5,094,542 A | * | 3/1992 | Engels et al. | 366/282 |
| 5,095,236 A | | 3/1992 | Walsh | |
| 5,863,121 A | * | 1/1999 | Dunk | 366/285 |
| 5,934,802 A | * | 8/1999 | Xie | 366/100 |
| 6,227,697 B1 | * | 5/2001 | Stahl | 366/288 |
| 7,384,187 B2 | * | 6/2008 | Blackburn et al. | 366/206 |
| 2003/0193835 A1 | * | 10/2003 | Richardson | 366/282 |
| 2009/0084274 A1 | * | 4/2009 | Kovacic et al. | 99/492 |
| 2009/0249908 A1 | * | 10/2009 | Kovacic et al. | 74/396 |

* cited by examiner

KITCHEN APPLIANCE PROVIDED WITH A REINFORCED ELECTRIC MOTOR-GEAR STAGE ARRANGEMENT AND METHOD FOR PRODUCING AN ELECTRIC MOTOR-DRIVEN KITCHEN APPLIANCE

The invention relates to an electric motor-driven kitchen appliance, particularly a single or multipurpose electric motor-driven kitchen appliance, provided with an insertable electric motor-gear stage arrangement comprising an electric motor having a motor housing, and a gear stage having a gear casing fastened to said electric motor; the invention further relates to a method for producing an electric motor-driven kitchen appliance.

BACKGROUND OF THE INVENTION

Known from document DE 25 51 842 is a multipurpose kitchen appliance having a plurality of holders for attachments, such as a dough hook, meat grinder or the like, which are driven at different rotational speeds. At least one gear stage is required for this purpose, to enable the rotational speed provided by the electric motor to be adapted to the speed required by each tool.

DE 39 32 760 A1 discloses a frame for electric motors for driving domestic appliances such as mixers, electric knives and the like, having two lateral supports interconnected at the front end by bridging pieces. These bridging pieces support the motor shaft, and it is also possible for one of the two bridging pieces to support the drive system. The motor frame is formed from two interconnected half shells having a cutout in their central area to allow a stator, a rotor with collector and a fan wheel to pass through, as well as support points for the motor shaft and drive system.

SUMMARY OF THE INVENTION

The object of this invention is to provide an electric motor-driven kitchen appliance and a method for producing such a kitchen appliance whereby the item can be assembled more easily and its production can be designed to be more cost-effective.

This object is inventively achieved by the electric motor-driven kitchen appliance and by the method for producing a kitchen appliance as described herein with respect to the exemplary embodiments. Further advantageous embodiments and developments of the invention, which can be applied individually or in any combination with one another, will emerge from the respective exemplary embodiments described herein.

The electric motor-driven kitchen appliance to which the invention relates, in particular the single or multipurpose kitchen appliance, provided with an insertable electric motor-gear stage arrangement comprising an electric motor having a motor housing and a gear stage having a gear case fastened to said electric motor, comprises a preferably removable reinforcement frame arranged around the motor housing and gear casing.

The electric motor and gear stage are preassembled into an electric motor-gear stage arrangement. The electric motor-gear stage arrangement can thus be tested and rated separately from the electric motor-driven kitchen appliance, in particular while separate from the housing of said electric motor-driven kitchen appliance. This makes it possible to find out in advance whether there are any deficiencies in the electric motor or the gear stage or the arrangement of the electric motor and the gear stage. For example, noise measurement can be used on the electric motor-gear stage arrangement to determine whether said electric motor-gear stage arrangement, that is, the central functional component of the electric motor-driven kitchen appliance, is operating perfectly. The electric motor-gear stage arrangement is strengthened with the aid of the removable reinforcement frame. This is particularly advantageous since it provides reinforcement against torsion along an axis of the motor. Both the motor housing and the gear casing can then be designed more simply.

For example the motor housing or the gear casing is produced using fiber-reinforced plastic. The removable reinforcement frame is advantageously made of metal.

In particular the reinforcement frame forms a connection which is in the main torsionally rigid along the connecting line between the electric motor and the gear stage, it being in particular possible for the torsionally rigid connection to withstand torque values within the range 3 Newtonmeter to 100 Newtonmeter, and preferably within the range 5 Newtonmeter to 50 Newtonmeter, though the particularly preferred range is from 10 Newtonmeter to 20 Newtonmeter.

In particular the reinforcement frame can be produced from metal, in particular by punching, pressing or die-casting. Manufacturing processes of this kind can produce particularly torsionally rigid structures.

The reinforcement frame is screwed to the gear casing and/or motor housing in particular fewer than ten screws, but in particular fewer than six screws, and preferably only one screw.

The gear casing and motor housing or the reinforcement frame can have connection elements, in particular connection projections, preferably an annular spring, and connection counter elements, in particular connection receivers, preferably an annular groove, providing a thread-free means of fastening the reinforcement frame to the gear casing or motor housing. Thread-free fastenings for the reinforcement frame have the advantage that in the main said reinforcement frame need only be slipped over the electric motor-gear stage arrangement, thereby greatly simplifying the cost and effort of assembly.

The reinforcement frame advantageously has a U-shaped or L-shaped metal section. A profile of this kind enables the reinforcement frame to be made relatively light while being capable of withstanding high torque values. In practice a particularly light embodiment of the electric motor-gear stage arrangement is advantageous in order to make the kitchen appliance easy to handle.

In a particular embodiment an attachment, in particular a puree blender, mixer, shredder, kneader and/or cutter, a crusher or beater, a drinks mixer, a slicer, a flour sifter, a juicer and/or a meat grinder can be connected to the kitchen appliance. For this purpose the kitchen appliance has in particular a plurality of attachment holders that can be operated at different revolution frequencies depending on the attachment concerned. The plurality of attachments enables the kitchen appliance to be versatile in use.

The motor housing and/or gear casing in particular are made from plastic, and in particular from glass fiber or carbon fiber reinforced plastic. The reinforcement frame enables both the motor housing and the gear casing to be simply and cost-effectively produced, since mechanical stability is not provided by the motor housing or gear casing as such, but rather, they must first be connected with the reinforcement frame.

The gear casing and motor housing in particular are connected together by means of a bolt flange, in particular by means of a bayonet lock. A bayonet lock greatly simplifies assembly of the electric motor with the gear stage and enables the kitchen appliance to be produced more cost-effectively.

The inventive method is for producing a kitchen appliance, in particular the inventive kitchen appliance, provided with a housing that has an electric motor fitted with a motor housing and a gear stage fitted with a gear casing, wherein the motor housing is connected to the gear casing, for the purpose of preassembling an electric motor-gear stage arrangement, in such a way that a motor shaft of the electric motor is coupled to a drive shaft of the gear stage in a torsionally rigid manner, and a reinforcement frame is placed around the gear casing and motor housing so that the gear casing is connected to the motor housing in a torsionally rigid manner; and wherein the preassembled electric motor-gear stage arrangement is then installed in the appliance housing.

The electric motor-gear stage arrangement is considerably strengthened and stabilized by the use of a reinforcement frame. The electric motor-gear stage arrangement can be preassembled and then tested and rated outside of the kitchen appliance housing. This enables the assembly and production of the kitchen appliance to be considerably simplified.

The reinforcement frame is fastened to the motor housing and/or gear casing using in particular fewer than ten screws, but in particular fewer than six screws, and preferably only one screw. The reinforcement frame can also be clipped to the motor housing and/or gear casing. The use of clips can enable the respective components to be firmly fastened in a very quick and easy way. The electric motor-gear stage arrangement is advantageously tested and rated prior to installation in the appliance housing.

BRIEF DESCRIPTION OF THE DRAWINGS

Further advantageous features and embodiments, which can be applied individually or in any combination with one another, are explained in greater detail with the aid of the accompanying drawings, which are provided merely for exemplary illustration without imposing any limitations on the invention.

These show diagrams of the following.

DETAILED DESCRIPTION OF THE EXEMPLARY EMBODIMENTS OF THE PRESENT INVENTION

Figure 1:
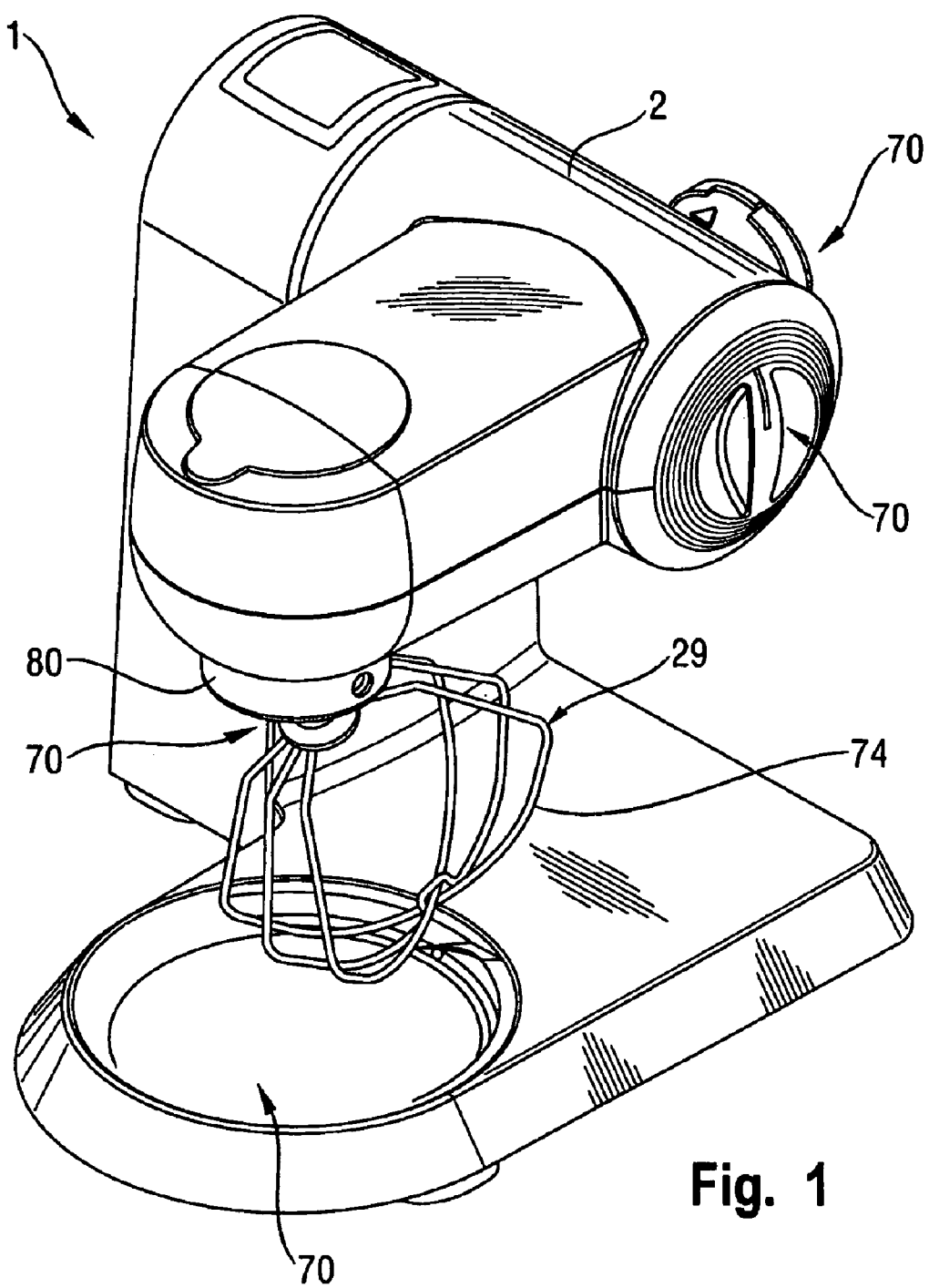
FIG. 1 An oblique perspective view of an inventive kitchen appliance seen from the side and from above.

FIG. 1 shows an oblique perspective view of an inventive kitchen appliance 1 seen from the side and from above together with a housing 2 for said appliance and four different holders 70 for an attachment 29, which can be embodied in the form of a beater 74. In this case three of the four holders 70 can be driven by the electric motor 3 (see FIG. 2 to 6).

Figure 2:
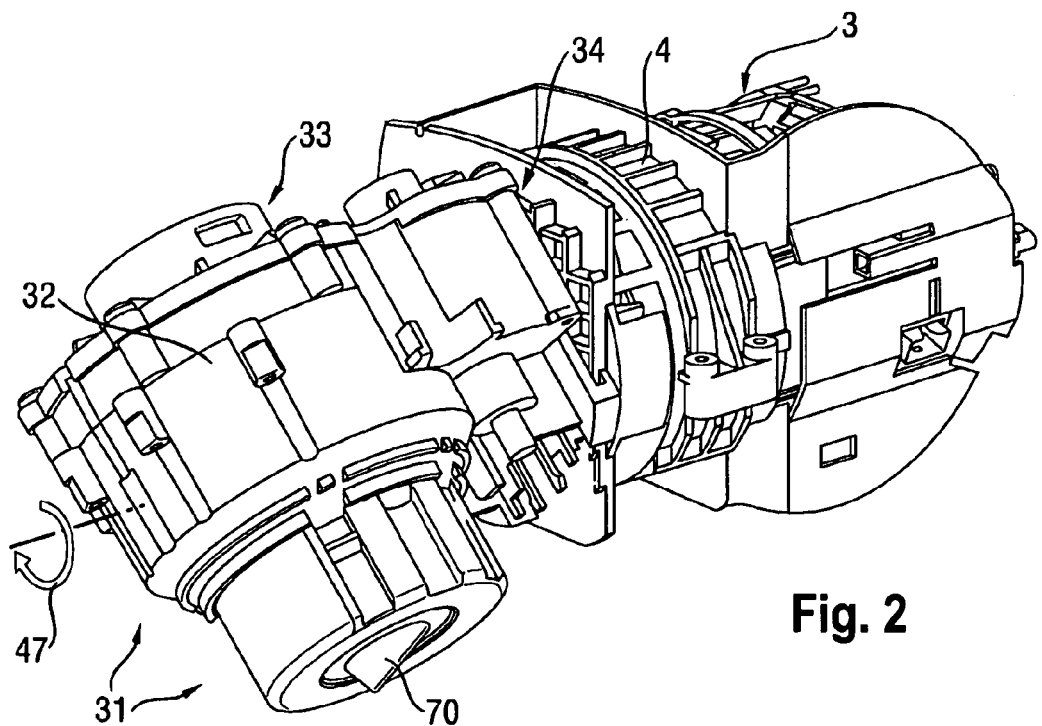
FIG. 2 An oblique perspective view showing an electric motor-gear stage arrangement of the inventive kitchen appliance during connection of the electric motor to a gear stage.

FIG. 2 is an oblique perspective view showing an electric motor-gear stage arrangement 31 of the inventive kitchen appliance 1 during preassembly, wherein a gear stage 33 is connected to the electric motor 3 by connecting together a gear casing 32 and a motor housing 4 with the aid of a bayonet lock 34, whereby the gear casing 32 is rotated through an angle, placed on the motor housing 4 and fastened in place by being rotated in a direction of rotation 47. The bayonet lock 34 enables the gear stage 33 to be simply but reliably connected to the electric motor 3 by rotating said gear stage and moving it a short distance.

Figure 3:
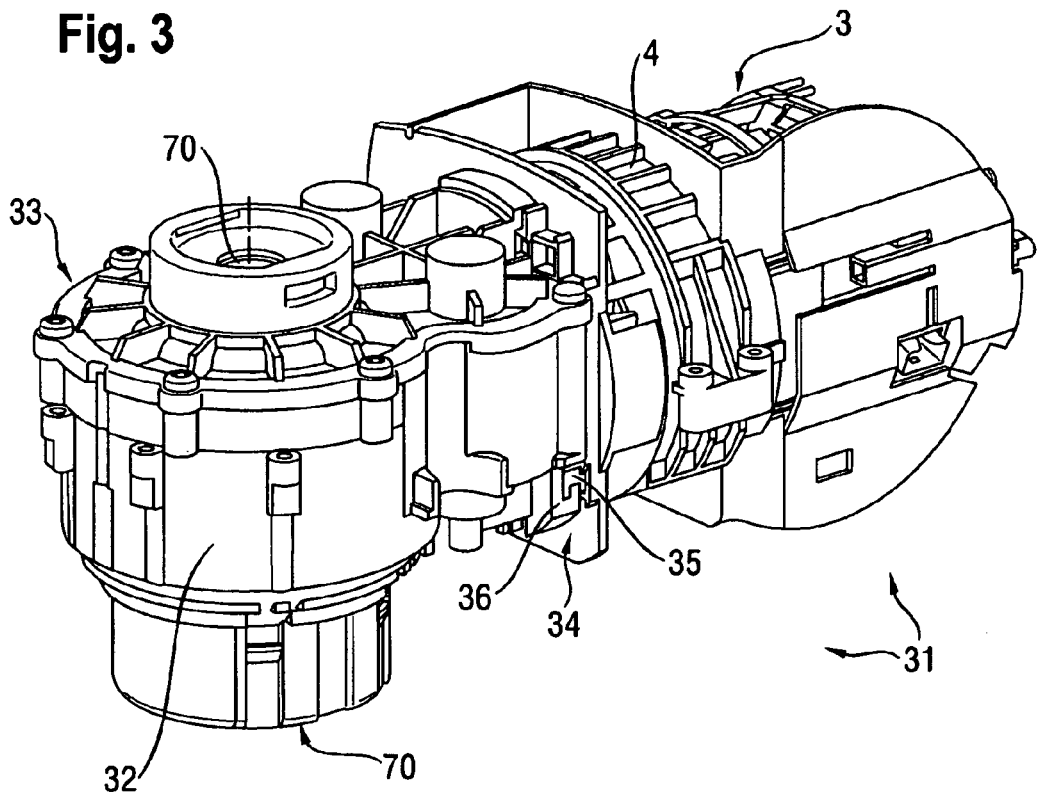
FIG. 3 The electric motor-gear stage arrangement in FIG. 2 with preassembly completed.

FIG. 3 shows an oblique perspective view of the electric motor-gear stage arrangement 31 as shown in FIG. 2, wherein the gear stage 33 is fastened to the electric motor 3 with the aid of the bayonet lock 34 by engaging a first bayonet lock part 35 on the electric motor 3 in a correspondingly matching second bayonet lock part embodied on the gear stage 33.

Figure 4:
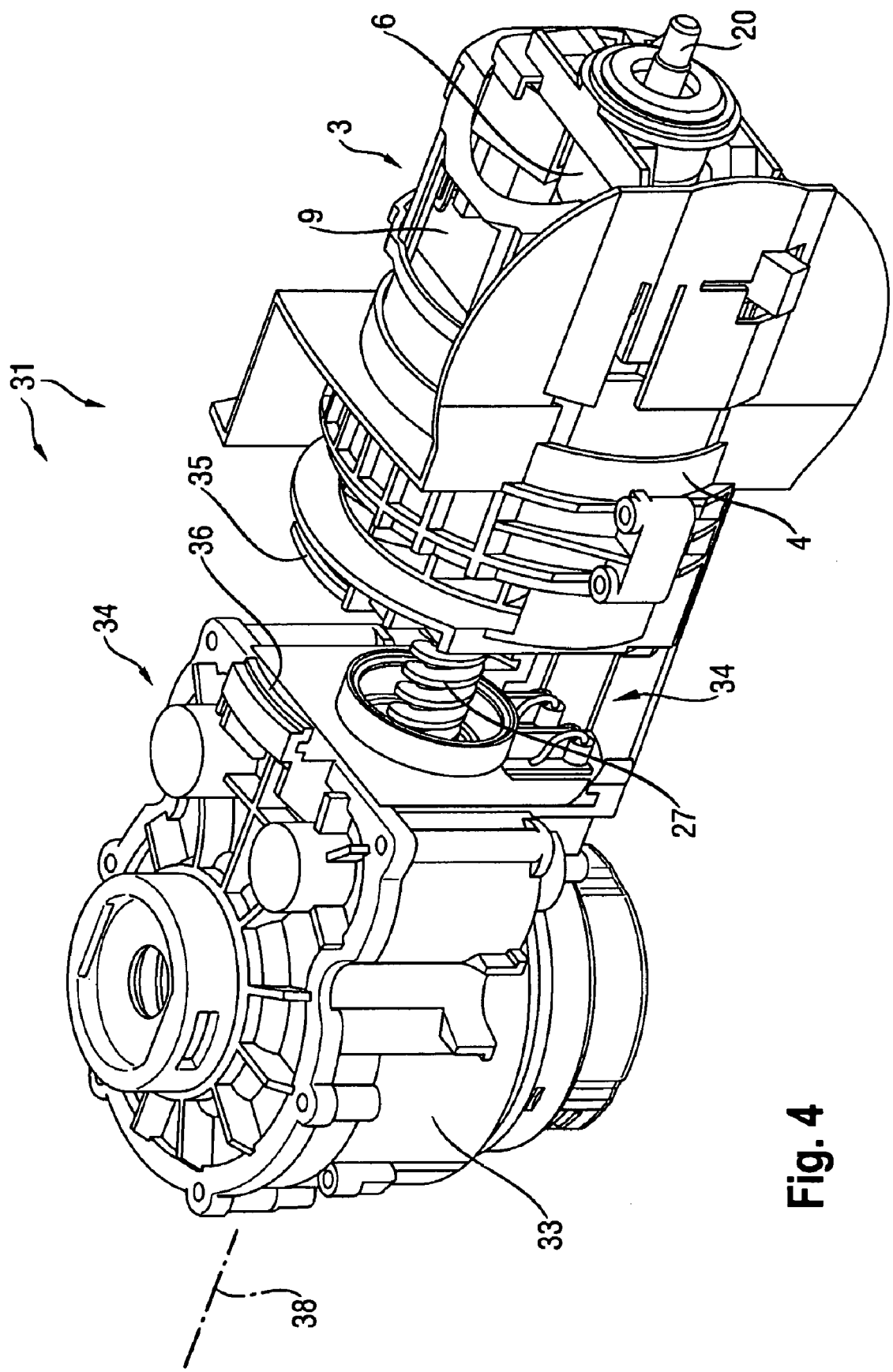
FIG. 4 The electric motor-gear stage arrangement in FIGS. 2 and 3 before assembly of the electric motor with the gear stage.

FIG. 4 shows an oblique perspective view of a further electric motor-gear stage arrangement 31 of the inventive kitchen appliance 1 in the state immediately before preassembly, wherein the electric motor 3 and the gear stage 33 are moved together along a connecting line 38, when a gearing worm 27 of the electric motor 3 penetrates the interior of the gear stage 33, it being possible by rotation of the gear stage 33 relative to the electric motor about the connection line 38 to engage the first bayonet lock part 35 on the electric motor 3 in the second bayonet lock part 36 on the gear stage 33.

Figure 5:
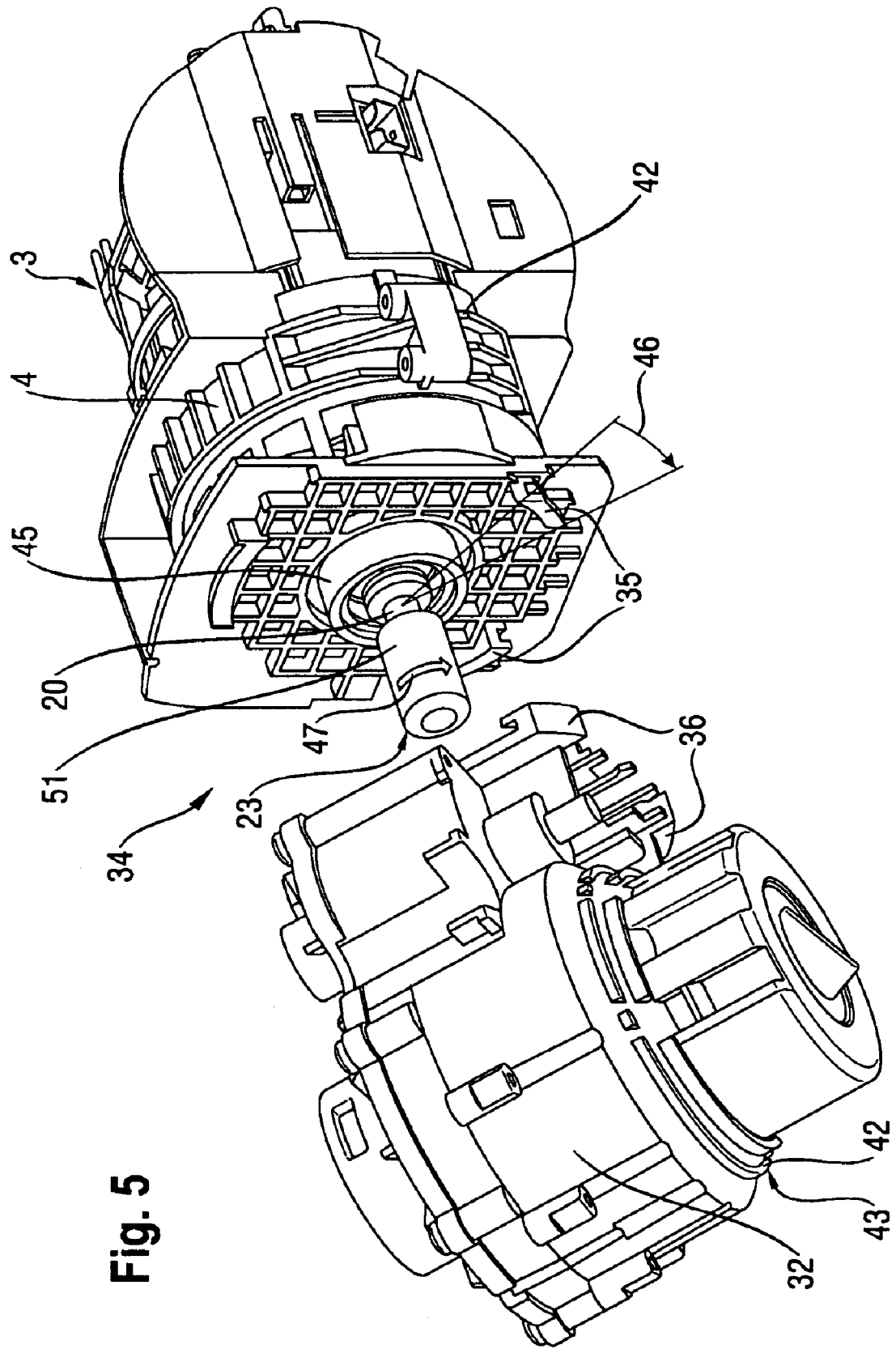
FIG. 5 A further electric motor-gear stage arrangement for an inventive kitchen appliance before preassembly of the electric motor with the gear stage.

FIG. 5 shows an electric motor-gear stage arrangement 31 of the inventive kitchen appliance 1 before assembly. To lock the bayonet lock 34, the gear casing 32 is rotated through a locking angle 46 of 30° relative to the motor housing 4, so that the first bayonet lock parts 35 located on the motor housing 4 engage with the second bayonet lock parts 36 located on the gear casing 32. Located on a motor shaft 20 is a gearing element 23 embodied as a first cylindrical crossed helical gear wheel 51, which rotates in the direction of rotation 47 when the electric motor 3 is operating, so that the rotation of the motor shaft 20 keeps the bayonet lock 34 locked during operation. The gear casing 32 or the motor housing 4 has connection counter elements 42 which are embodied in the form of connection receivers 43 to receive a reinforcement frame 37 (see FIG. 6) having corresponding connection projections 41. The reinforcement frame 37 also stabilizes the gear casing 32 relative to the motor housing 4.

Figure 6:
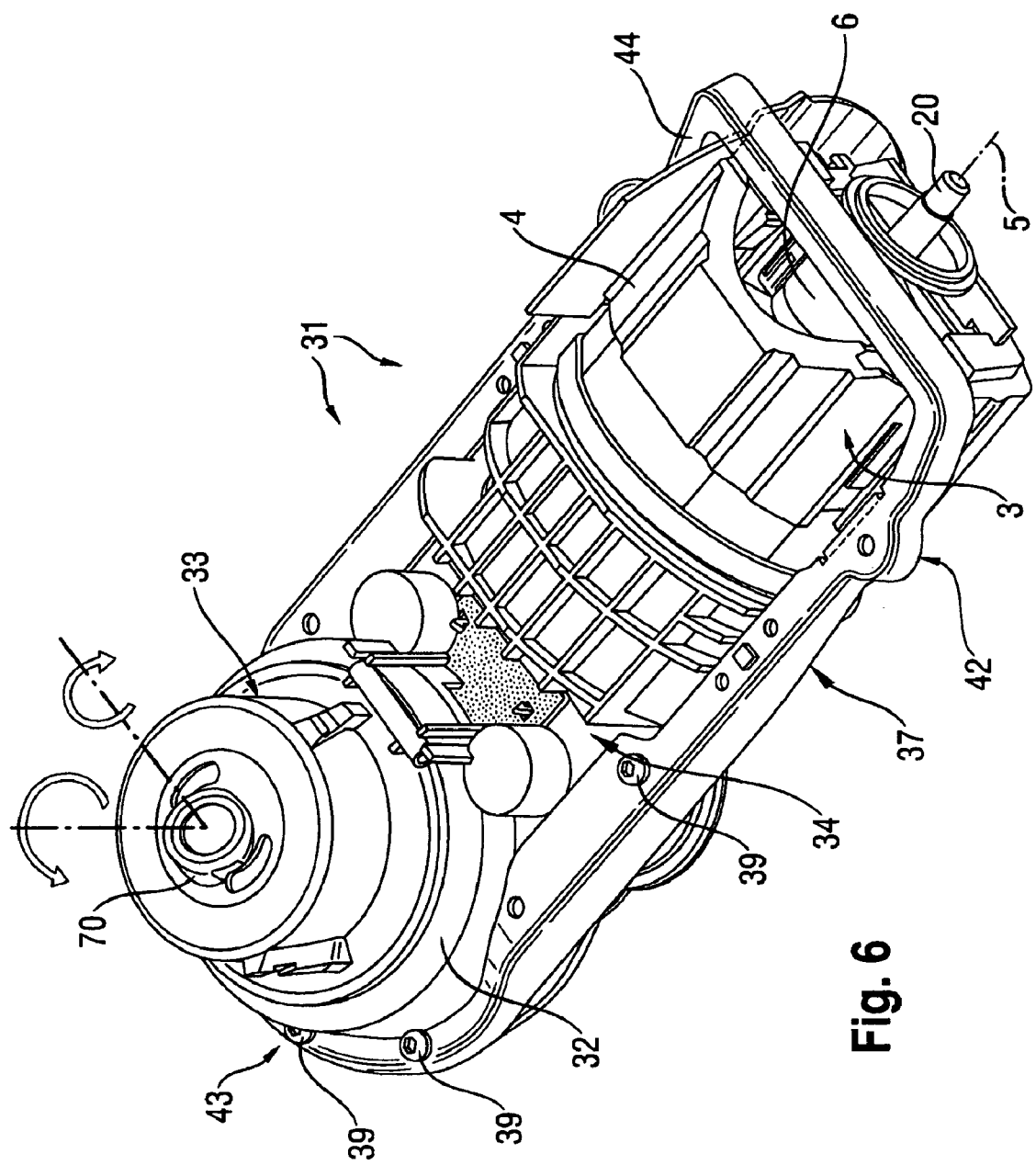
FIG. 6 An electric motor-gear stage arrangement as shown in FIGS. 2 to 5 complete with reinforcement frame.

FIG. 6 shows an oblique perspective view of the electric motor-gear stage arrangement 31 seen in FIG. 5, in its preassembled state, wherein the reinforcement frame 37 also reinforces the gear stage 33 and the electric motor 3 against torsion relative to one another. The reinforcement frame 37 is screwed to the motor housing 4 and/or to the gear casing 32 with the aid of screws 39. The reinforcement frame 37, which has an L-shaped profile, is fixed to the motor housing 4 or to the gear casing 32 with the aid of connection receivers 43. The reinforcement frame 37 is embodied with an L-shaped metal section. The rotation of the motor shaft 20 of the electric motor 3 about the motor's axis of rotation 5 operates in the closing direction of the bayonet lock 34, so that the gear stage 33 cannot work loose from the electric motor 3 even under heavy load. The gear stage 33 has a holder 70 which can accept an attachment 29 such as a beater 74.

Figure 7:
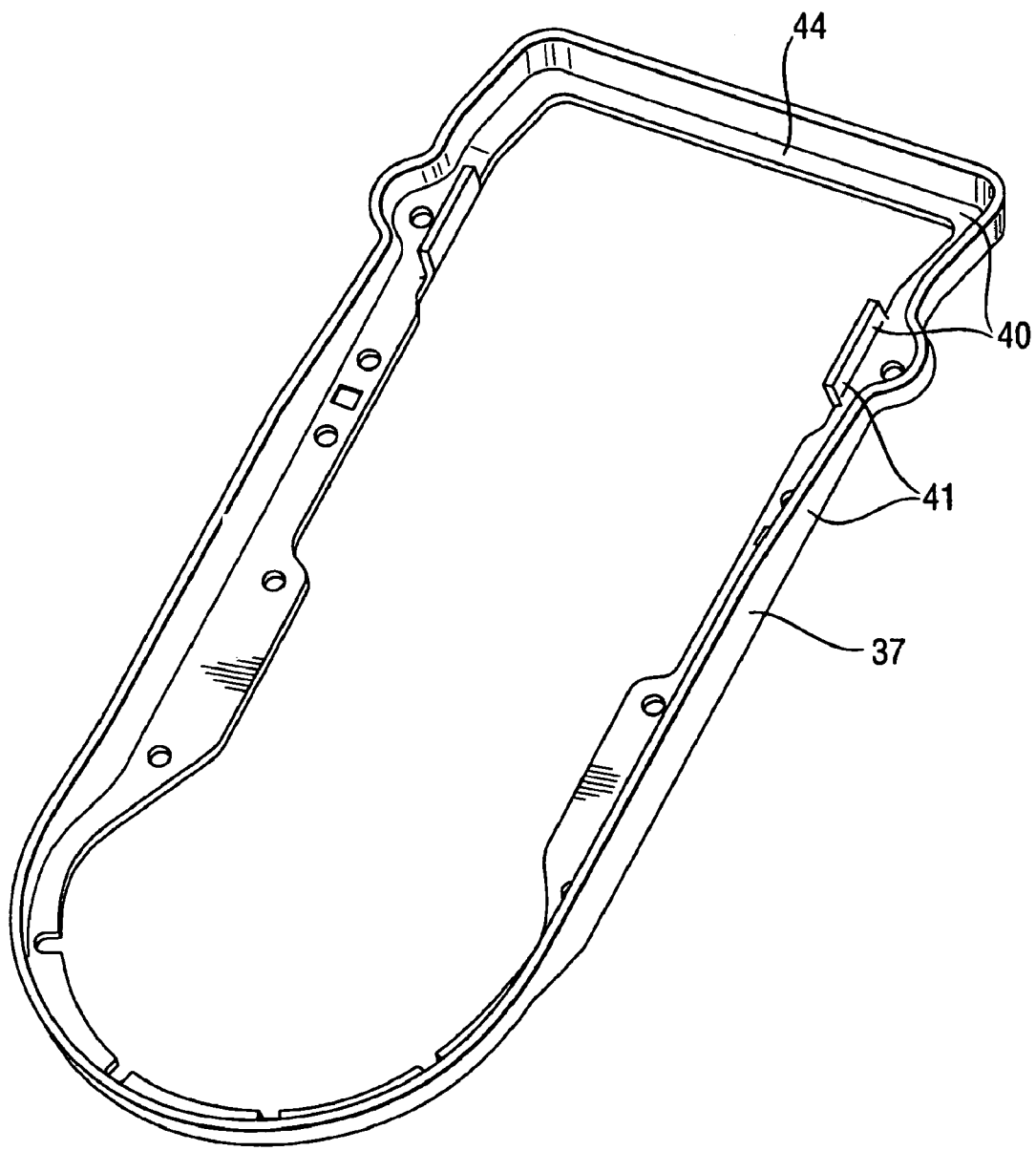
FIG. 7 The reinforcement frame shown in FIG. 6.

FIG. 7 shows an oblique perspective view of the reinforcement frame 37 in FIG. 6. The reinforcement frame 37 is embodied as an L-shaped metal section 44 with corresponding connection elements 40 and connection projections 41 enabling it to be fastened to the gear casing 32 or to the motor housing 4, for which purpose only a few screws 39 are needed. The reinforcement frame enables torque values of some 20 Nm to be accepted from the electric motor 3. This approach produces a particularly rigid design which enables the electric motor-gear stage arrangement 31 to be preassembled so that the electric motor-gear stage arrangement 31 can be tested and rated prior to installation in a housing 2 of the kitchen appliance 1.

Figure 8:
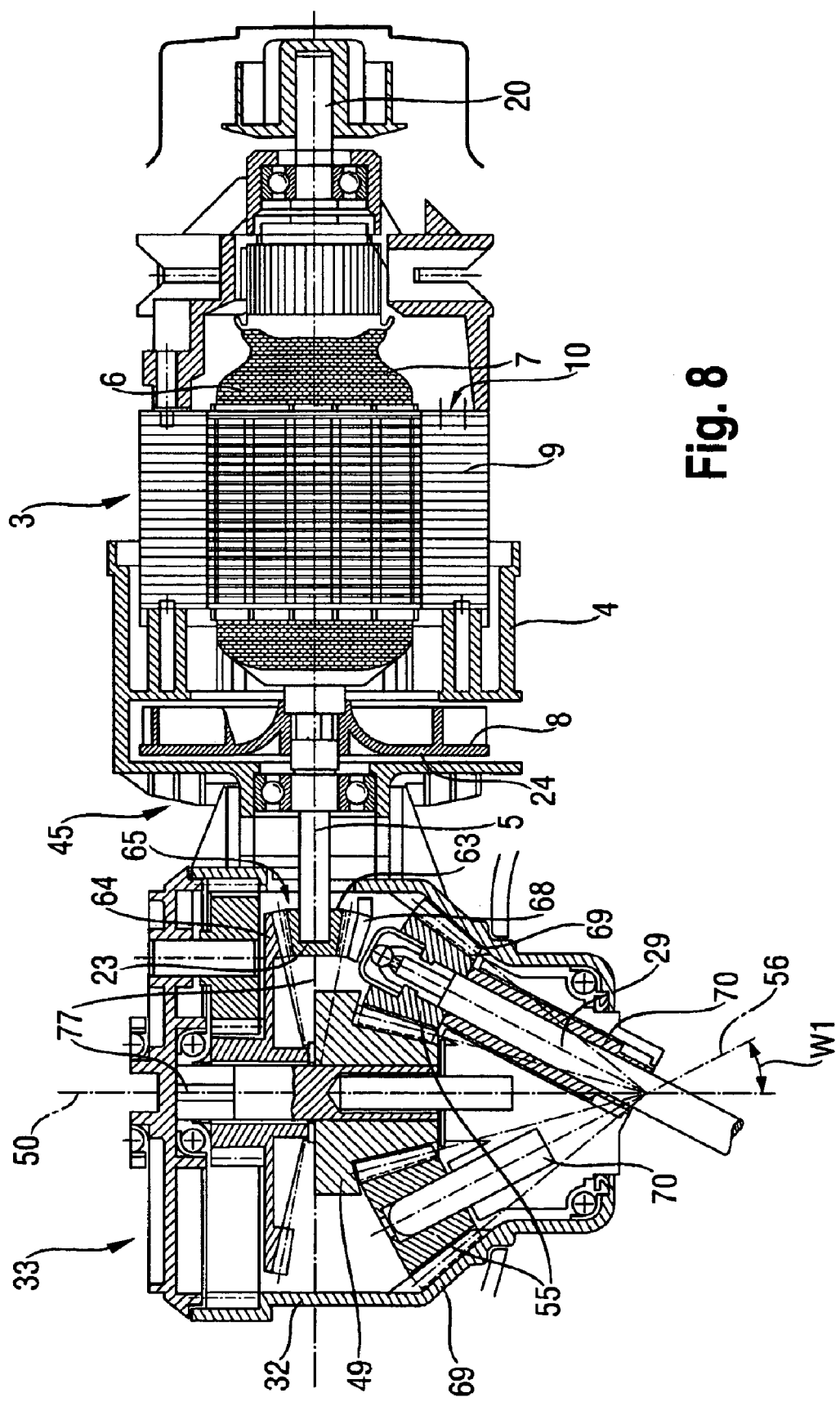
FIG. 8 A longitudinal section through the electric motor-gear stage arrangement as shown in FIGS. 2 to 6 with a vertical intersecting plane.

FIG. 8 shows a longitudinal section with perpendicular intersecting plane, through the electric motor-gear stage arrangement 31. The electric motor 3 comprises the motor housing 4 in which are arranged a stator 9 having a corresponding stator coil 10 and a rotor 6, which is free to move within said housing, having a corresponding rotor coil 7. Located on the motor shaft 20 is a cooling wheel 24, embodied as a fan wheel 8. The dimensioning of the cooling wheel 24, in particular the strength of the material used and the thermal properties of the material used, enables the heat developed in the rotor coil 7 or in the gear stage 33 to be dissipated by heat conduction. Connected to the motor shaft 20 in a torsionally rigid manner is a gearing element 23 which, in the form of a first bevel gear 23, and together with a second bevel gear 64 of the gear stage 33, forms a helical-bevel gearbox 65. The second bevel gear 64 is used to start the rotation of a sun gear 49 of a planetary gear set 54, which for its part is engaged with three planet wheels 55 which for their part run on a ring gear 49. The rotation of the motor shaft 20 rotates the planet wheels 55 not only about their respective planet wheel axes 56 but also about a sun gear axis 50, so that an attachment 29 plugged into a holder 70 of the planet wheel 55 executes a rotary motion on a cone. The sun gear axis 50 is perpendicular to the motor's axis of rotation 5. The drive shafts 77 of the helical-bevel gearbox 65 are largely perpendicular to one another. The motor's axis of rotation 5 is then largely coplanar on a level with the sun gear axis 50. The angle W1 defined by the planet wheel axis 56 and the sun gear axis 50 is around 30°.

Figure 9:
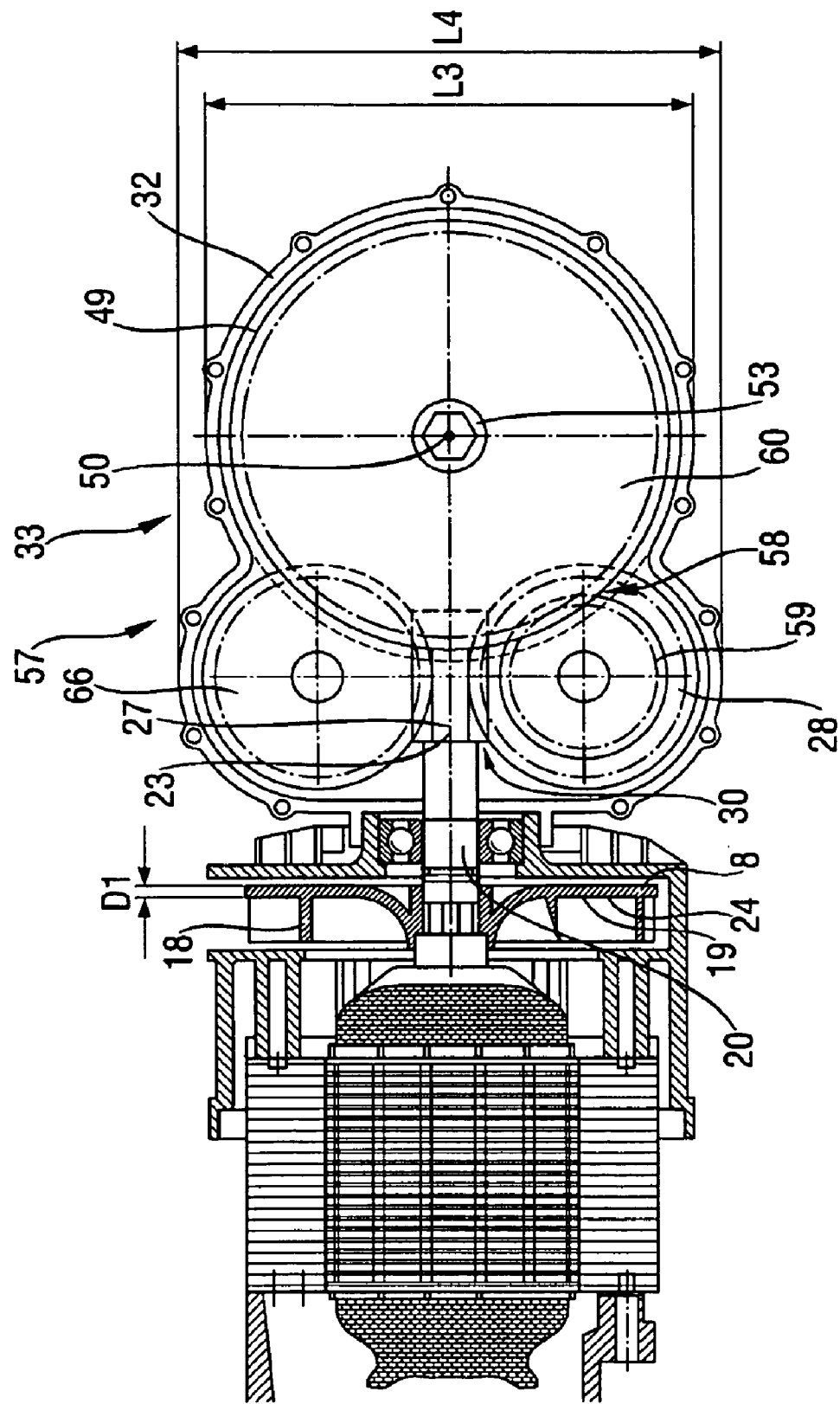
FIG. 9 A longitudinal section through the electric motor-gear stage arrangement as shown in FIGS. 2 to 6 or 8 with a horizontal intersecting plane.

FIG. 9 shows an electric motor-gear stage arrangement 31 of the inventive kitchen appliance 1 as a longitudinal section with a horizontal intersecting plane, and shows a gear stage 33 having a worm gear pair 30 and a parallel shaft gearbox 58. Located on the motor shaft 9 in a torsionally rigid manner is a gearing worm 27 that engages with a worm gear 28 which is connected in a torsionally rigid manner to a first spur wheel 59. Arranged opposite the worm gear by reference to the gearing worm 27 is a mating gear 66, which is engaged with the gearing worm 27 and absorbs counter-forces. The first spur wheel 59 is engaged with a second spur wheel 60, which is connected in a torsionally rigid manner via a sun gear shaft 53 to the sun gear 49. Whereas the worm gear pair has a gear ratio of around 1:1, a gear reduction of 4:1 is obtained with the parallel shaft gearbox 58. The length L3 is between 80 and 100 mm. The length L4 is between 90 and 120 mm. The cooling wheel 6 enables heat generated in the gearing worm 27 to be dissipated by heat conduction, while the heat generated inside of the motor shaft 20 is dissipated to the cooling wheel 24. The cooling wheel has a wide seat and a considerable thickness D1 in order to keep the heat transfer resistance and heat conduction resistance as low as possible. Additional cooling of the worm gear pair 30 then becomes superfluous. The cooling wheel 24 also has fan blades 18 which give support to the cooling process.

Figure 10:
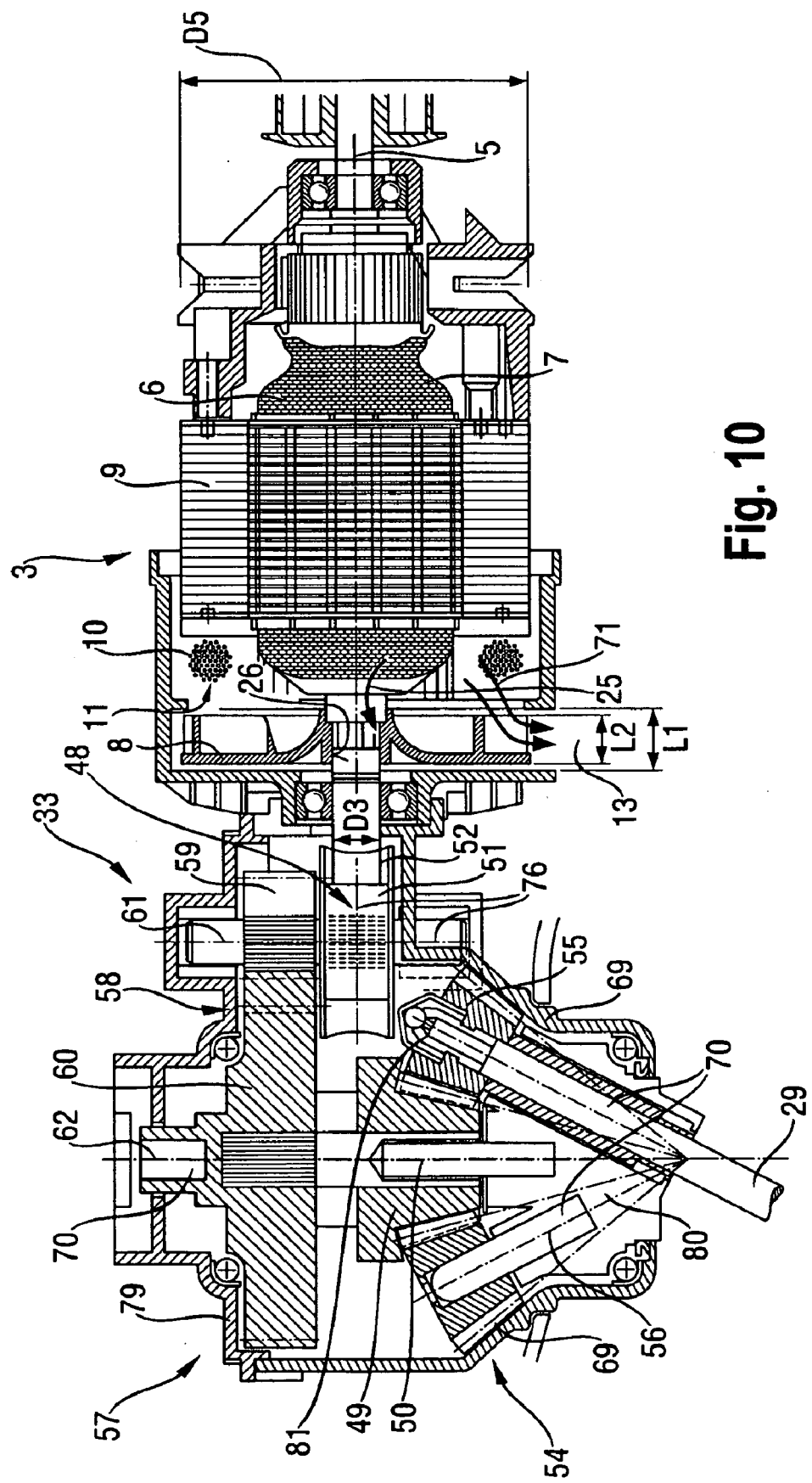
FIG. 10 A further embodiment of an electric motor-gear stage arrangement of the inventive kitchen appliance shown in longitudinal section and with a vertical intersecting plane.

FIG. 10 shows an electric motor-gear stage arrangement 31 of the inventive kitchen appliance, having a parallel shaft gearbox 58 and a cylindrical crossed helical gear 48 as the gear stage 33, wherein the cylindrical crossed helical gear 48 has a first cylindrical crossed helical gear wheel 51, which is fastened on the motor shaft 20, and a second cylindrical crossed helical gear wheel 52, which is connected in a torsionally rigid manner to a first spur wheel 59. The first spur wheel 59 is engaged with a second spur wheel 60, which is fastened on a second spur wheel shaft 62 and connected in a torsionally rigid manner to the sun gear 49. The second spur wheel shaft 62 is largely parallel to a first spur wheel shaft 61 of the first spur wheel 59. The second spur wheel shaft 62 has a holder 70 for an attachment 29. A casing cover 79 has to be lifted in order to insert said attachment into the holder 70. The parallel shaft gearbox 58 and the cylindrical crossed helical gear 48 form a connection that transmits the rotation for the planetary gear set 54, which has the sun gear 49, three planet wheels 55 and a ring gear 69. The sun gear 49, the planet wheels 55 and the ring gear 69 are conical in shape, so that when the motor shaft 20 rotates, an attachment 29, inserted in a holder 70 on the planet wheels 55, rotates about a planet wheel axis 56 which for its part rotates on a cone about a sun gear axis 50. Due to the cone shape of the sun gear 49, the planet wheels 55 and the ring gear 69, the attachment 29 executes a wobbling movement, wherein the wobbling movement runs off-center on a cone with an apex angle of around 60°. The attachment 29 can be plugged into the holder 70 of a planet wheel 55 and be retained with the aid of an attachment holder 81. The cylindrical crossed helical gear 48 has drive shafts 76 which are largely perpendicular to one another. The electric motor 3 has a rotor 6 holding the rotor coil 7, cooled by the cooling air 71 created by the fan wheel 8. A stator 9 of the electric motor 3 has a stator coil 10 that is arranged facing the fan wheel 8 with an obstacle-free space between them. This allows the cooling air 71 to come into direct contact with a winding end 11 of the stator coil 10. The motor housing 4 has outlets 13 for the cooling air 71, said outlets having a length L1 corresponding more or less to the axial length L2 of the fan wheel 8. The thickness of the fan wheel 8 is 30% of the diameter D3 of the motor shaft 20 and effects good heat evacuation away from the motor shaft 20 to areas located outside of the fan wheel 8 in a radial direction. The diameter D5 of the cooling wheel 64 corresponds largely to the diameter of the stator coil 10 at a level perpendicular to the motor's axis of rotation 5. The fan wheel 8 is used to evacuate cooling air in particular from the interior of the motor housing to the exterior.

Figure 11:
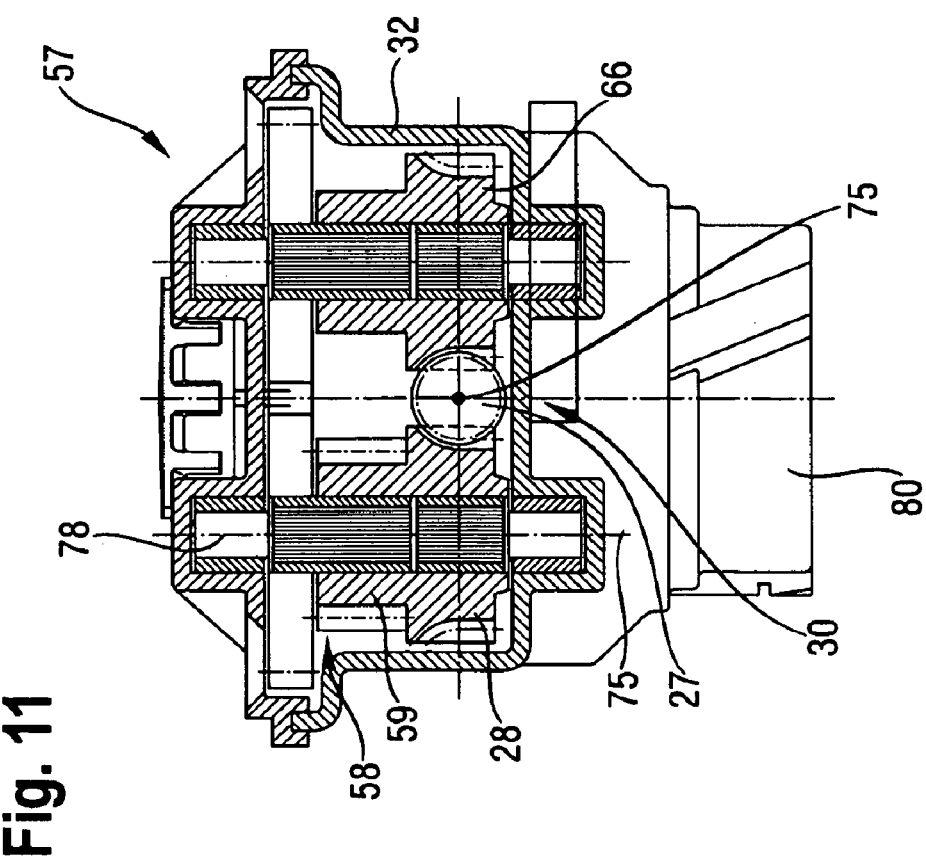
FIG. 11 A cross-section, perpendicular to the axis of rotation of the motor, through a gear stage of an inventive kitchen appliance.

FIG. 11 shows a connection 57 that transmits the rotation, with a parallel shaft gearbox 58 and a worm gear pair 30 as a cross-section along a vertical intersecting plane perpendicular to the motor's axis of rotation 5. A gearing worm 27 engages with a worm gear 28 which is connected in a torsionally rigid manner via a drive shaft 75 to a first spur wheel 59, which in turn is engaged with a second spur wheel 60 (not shown). A mating gear 66 for a worm wheel absorbs counter-forces, so that the gearing worm 27 cannot break out to the right. A beater 74 (see FIG. 1) can be fitted on an appliance head 80.

Figure 12:
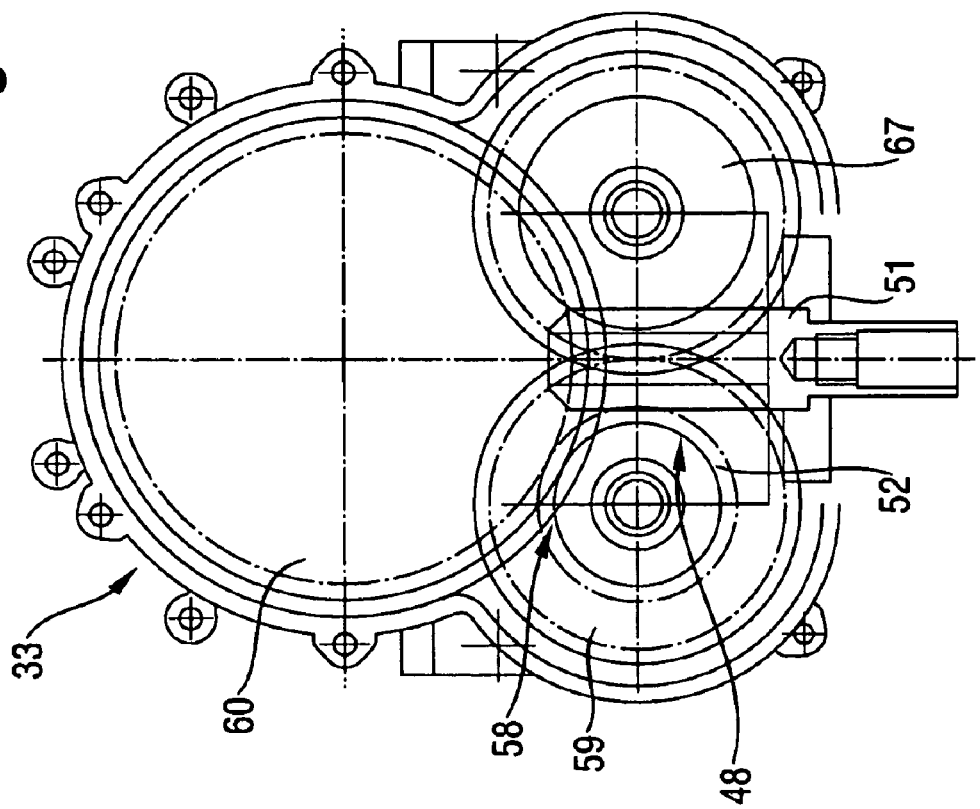
FIG. 12 A diagram showing a top view of a gear stage arrangement of an inventive kitchen appliance.

FIG. 12 shows a further embodiment of the gear stage 33 with a parallel shaft gearbox 58 and a cylindrical crossed helical gear 48, wherein a first cylindrical crossed helical gear wheel 28 engages with a second cylindrical crossed helical gear wheel 52, which is connected in a torsionally rigid manner to a first spur wheel 59 that is engaged with a second spur wheel 60. A mating gear 67 for a spur wheel is arranged opposite the second cylindrical crossed helical gear wheel 52 relative to the first cylindrical crossed helical gear wheel 51, so that said mating gear can absorb counter-forces.

Figure 13:
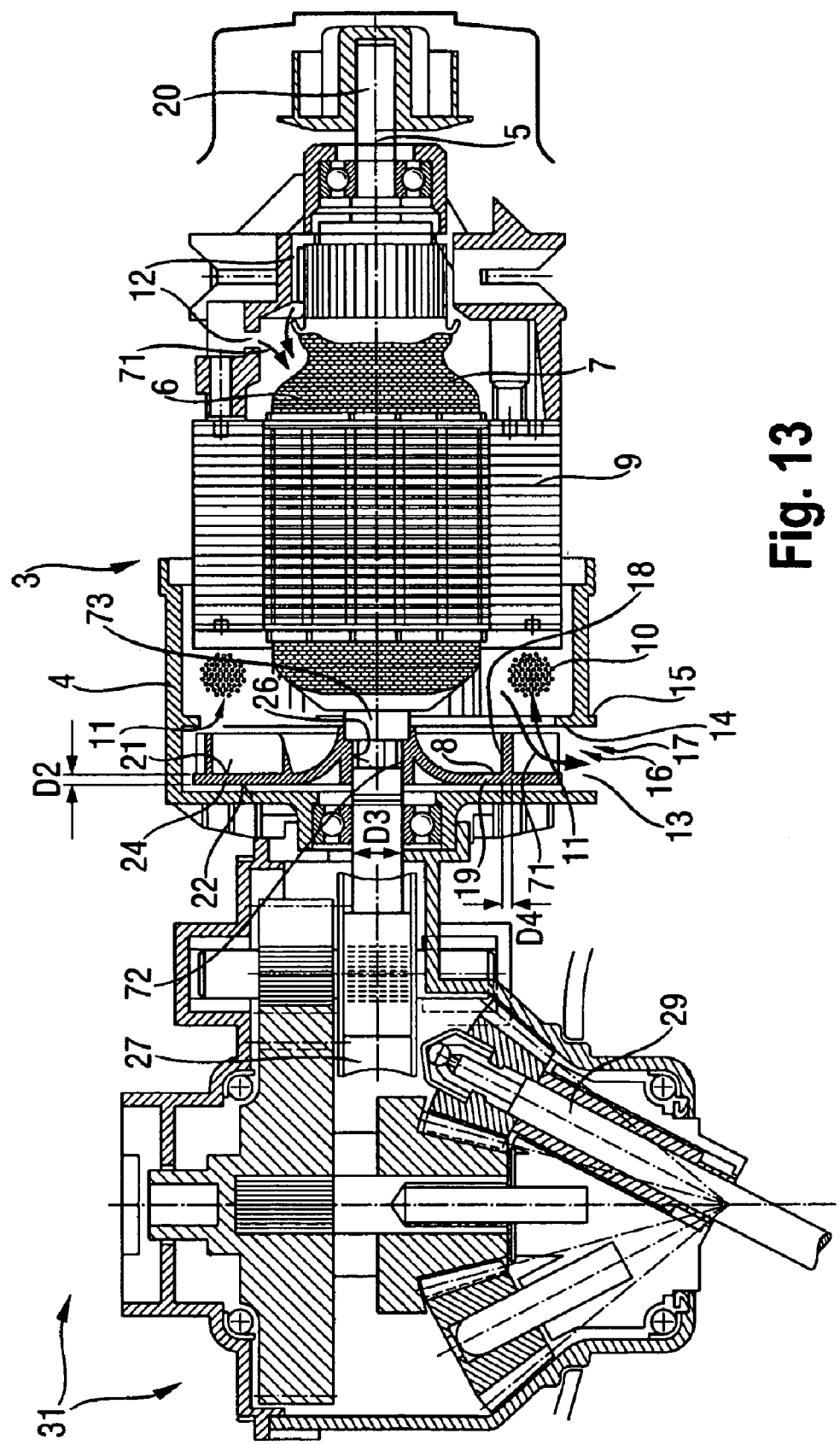
FIG. 13 A longitudinal section with perpendicular intersecting plane, through the electric motor-gear stage arrangement of an inventive kitchen appliance.

FIG. 13 shows a further embodiment of the electric motor-gear stage arrangement 31 as a longitudinal section with a vertical intersecting plane, wherein a cooling wheel 24 is fastened on the motor shaft 20, said cooling wheel having a highly heat-conducting contact surface 26 and being connected to the motor shaft 20, so that the heat transfer resistance 72 can be as small as possible. Heat that forms in the gearing worm 27 or in the rotor coil 7 of the rotor 6, is conducted in the motor shaft 20, which has the smallest possible heat conduction resistance 73, via the contact surfaces 26 to the cooling wheel 24, which can easily absorb the heat due to its significant wall thickness D2 and evacuate the heat efficiently to areas located outside of the cooling wheel 24 in a radial direction. The cooling wheel 24 also has fan blades 18 which generate a flow of cooling air 71 when the motor shaft 20 is rotating. The flow of cooling air 71 cools the cooling wheel 24 and hence helps to dissipate the heat conveyed by conduction. Furthermore the cooling wheel 24 creates cooling air 71 which passes directly over an end of winding 11 of a stator coil 10 on the stator 9, thereby also cooling the stator 9. The motor housing 4 has intake ports 12 for the cooling air 71, as well as outlets 13. The outlets have a first 14 and a second 15 edge designed to project inward and outward respectively, thereby creating a first flow channel 16 and a second flow channel 17 which encourage acceleration of the cooling air 71 and in so doing have a beneficial effect on cooling the electric motor 3. The cooling wheel 24 is embodied as a fan wheel 8 in that the fan blades 18 are mounted on a backing plate 19. The fan wheel 8 is die-cast. The wall thickness D4 of the fan blades 18 is around 20% of the diameter D3 of the motor shaft 20. The contact surface 26 roughly corresponds to the cross-sectional area of the motor shaft 20. Dimensioning the fan wheel 8 in this manner brings about efficient dissipation of the heat generated in the gearing worm 27 and rotor coil 7. The heat is exhausted via the fan wheel 8 in such a way that particularly rapid and efficient heat dissipation is achieved overall, even when the kitchen appliance 1 is under a heavy load.

Various further aspects related to the invention are described below. Each of said individual aspects can be applied separately, that is, independently of one another, or may be combined according to choice.

A particularly advantageous electric motor 3 for an electric motor-driven kitchen appliance 1, in particular for an electric motor-driven single or multipurpose kitchen appliance, comprising a motor housing 4 provided with a rotor 6 that rotates on a motor's axis of rotation 5 and has a fan wheel 8 fastened to it in a torsionally rigid manner, and also provided with a stator 9 that has a stator coil 10, wherein the stator coil 10 has an end of winding 11 which stretches parallel to a direction from the motor's axis of rotation 5 to the fan wheel 8, is characterized in that the end of winding 11 and the fan wheel 8 are arranged facing one another with a clear space between.

In one embodiment the electric motor 3 is an AC motor. In a further embodiment the electric motor 3 is a capacitor motor. In a still further embodiment the electric motor 3 is a shaded pole motor. In one embodiment the motor housing 4 has intake ports 12 and outlets 13 for cooling air 71 propelled by the fan wheel 8, and the length L1 of the outlets 13 along the direction of the motor's axis of rotation 5 corresponds in the main to the axial length L2 of the fan wheel 8. In a further embodiment the motor housing 4 has outlets 13 for cooling air 71 propelled by the fan wheel 8, said outlets having a first edge 14 that projects inward into the motor housing 4 and acts as a first flow channel 16 for accelerating the cooling air 71. Furthermore the motor housing 4 can have outlets 13 for cooling air 71 propelled by the fan wheel 8, said outlets having a second edge 15 that projects outward and acts as a second flow channel 17 for accelerating the cooling air 71. In a development, the fan wheel 8 comprises fan blades 18 and has a backing plate 19, arranged perpendicular to the motor's axis of rotation 5, with a first 21 and a second 22 plate surface, the fan blades 18 being attached to the backing plate 19. In a further development the fan blades 18 arranged together on the first plate surface 21, which in particular points straight at the stator coil 10, are arranged to be in particular highly heat-conducting. In a special embodiment the maximum nominal rotational frequency of the electric motor 3 is in a range from 8000 to 20000 revolutions per minute, in particular in a range from 10000 to 15000 revolutions per minute. The maximum bearable, nominal electrical power of the electric motor 3 can be in a range from 200 W to 1200 W, in particular in a range from 600 W to 900 W.

A particularly advantageous electric-motor driven kitchen appliance 1, in particular an electric-motor driven single or multipurpose kitchen appliance, comprises the inventive electric motor 3.

A particularly advantageous electric-motor driven kitchen appliance 1, in particular an electric-motor driven single or multipurpose kitchen appliance, having an electric motor 3 that has a stator 9 and a rotor 6 that rotates within it on a motor shaft 20, wherein the rotor 6 comprises a rotor coil 7 and the motor shaft 20 admits a gearing element 23, in particular a gearing worm 27 or a first cylindrical crossed helical gear wheel 51, is characterized in that a metal cooling wheel 24, connected in a torsionally rigid manner to the motor shaft 20, is provided for cooling the rotor coil 7 and/or for cooling the gearing element 23. Advantageously the cooling wheel 24 and the rotor 6 are connected via the motor shaft 20 in a heat-conducting manner so that when the system is operating at maximum nominal power of the electric motor 3, at least 20%, in particular at least 30%, and preferably at least 40% of the heat generated by the rotor coil 7 is dissipated by heat conduction to the cooling wheel 24. In particular the cooling wheel 24 and the gearing element 23 are connected in a heat-conducting manner so that when the system is operating at maximum nominal power of the electric motor 3, at least 60%, in particular at least 75%, and preferably at least 90% of the heat output introduced on the gearing element 23 is dissipated by heat conduction to the cooling wheel 24. In one embodiment a wall thickness D2 of the cooling wheel 24 is at least 20%, in particular at least 25%, and preferably at least 30% of the diameter D3 of the motor shaft 20 and is in particular in a range from 1.5 mm to 5 mm. In a variant, the sum of the heat transfer resistances 72 along the heat conduction section 25 rotor coil—rotor—motor shaft—cooling wheel 24 is less than the sum of the heat conduction resistances 73 between the rotor coil 7 and the cooling wheel 24, in particular less than 50%, preferably less than 30%, but particularly preferred as less than 10%. The cooling wheel 24 and the motor shaft 20 can be connected to a contact surface 26 that forms at least 40%, in particular at least 50%, and preferably at least 60% of the outer peripheral surface of a hollow cylinder having a diameter equal to the diameter D3 of the motor shaft 20 and a length equal to the diameter D3 of said motor shaft 20. Advantageously the cooling wheel 24 is arranged along the motor shaft 20 between the rotor coil 7 and the gearing element 23. The gearing element 23 can be a gearing worm 27. In one embodiment the cooling wheel 24 can be embodied as a fan wheel 8 and can in particular comprise fan blades 18 in which their wall thicknesses D4 are preferably at least 15%, but particularly preferred at least 20% of the diameter D3 of the motor shaft 20. Advantageously the cooling wheel 24 has a backing plate 19 arranged perpendicular to the motor's axis of rotation 5 and having a first 21 and a second 22 plate surface, wherein the fan blades 18 are attached to the backing plate 19 and in particular the thickness D1 of the backing plate 19 is at least 20%, and preferably at least 30% of the diameter D3 of the motor shaft 20. Advantageously the diameter D5 of the cooling wheel 24 corresponds largely to that of the stator 9. In a special embodiment the cooling wheel 24 consists of aluminum or an aluminum-zinc alloy. The cooling wheel 24 can be produced by casting or forging. In one embodiment, an attachment 29, in particular a puree blender, mixer, shredder, kneader and/or cutter, a crusher or beater 74, a drinks mixer, a slicer, a flour sifter, a juicer and/or a meat grinder can be inserted in the kitchen appliance 1.

A particularly advantageous arrangement of a worm gear pair 30 comprises a worm gear 28, a gearing worm 27, a motor shaft 20 and a cooling wheel 24, wherein the worm gear 28 engages with the gearing worm 27 connected in a torsionally rigid manner to the motor shaft 20, the cooling wheel 24 being connected in a torsionally rigid manner to the motor shaft 20, and said arrangement is characterized in that the cooling wheel 24 is made of metal and that when the system is operating at maximum nominal power, at least 60%, in particular at least 75%, and preferably at least 90% of the heat output created on the worm gear pair 30 is dissipated by heat conduction to the cooling wheel 24. The cooling wheel 24 can be a fan wheel 8.

A particularly advantageous electric motor-driven kitchen appliance 1, preferably a single or multipurpose kitchen appliance, provided with an insertable electric motor-gear stage arrangement 31 which comprises an electric motor 3 having a motor housing 4 and a gear stage 33 having a gear case 32 fastened to said electric motor, is characterized in that the inventive arrangement 31 comprises a removable reinforcement frame 37 arranged around the motor housing 4 and gear case 32.

In an embodiment, the reinforcement frame 37 forms a connection which is in the main torsionally rigid along the connecting line 38 between the electric motor 3 and the gear stage 33, it being in particular possible for the torsionally rigid connection to withstand torque values within the range 3 Nm to 100 Nm, and preferably within the range 5 Nm to 50 Nm, though the particularly preferred range is from 10 Nm to 20 Nm. The reinforcement frame 37 can be produced from metal, in particular by punching and pressing or by die-casting. The reinforcement frame 37 can be screwed to the gear casing 32 and/or motor housing 4 using in particular fewer than ten screws 39, but in particular fewer than six screws, and preferably only one screw. Advantageously the gear casing 32 and the motor housing 4 or the reinforcement frame 37 comprise connection elements D1, in particular connection projections 41, preferably an annular spring, and connection counter elements 42, in particular connection receivers 43, preferably an annular groove, providing a thread-free means of fastening the reinforcement frame 37 to the gear casing 32 or motor housing 4. The reinforcement frame 37 can advantageously have a U-shaped or L-shaped metal section 44. Advantageously, an attachment 29, in particular a puree blender, mixer, shredder, kneader and/or cutter, a crusher or beater 74, a drinks mixer, a slicer, a flour sifter, a juicer and/or a meat grinder can be connected to the kitchen appliance 1. The motor housing 4 and/or the gear casing 32 can be made from plastic, and in particular from glass fiber reinforced plastic. The gear casing 32 and the motor housing 4 can be connected together by means of a bolt flange 45, in particular by means of a bayonet lock 34.

A particularly advantageous method for producing a kitchen appliance 1, in particular the inventive kitchen appliance 1, provided with a housing that has an electric motor 3 fitted with a motor housing 4 and a gear stage 33 fitted with a gear casing 32, provides that for the purpose of preassembly the motor housing 4 is connected to the gear casing 32 in order to form an electric motor-gear stage arrangement 31, in such a way that a motor shaft 20 of the electric motor 3 is coupled to a drive shaft of the gear stage 33 in a torsionally rigid manner, and a reinforcement frame 37 is placed around the gear casing 32 and the motor housing 4 so that the gear casing 32 is connected to the motor housing 4 in a torsionally rigid manner; and provides that the preassembled electric motor-gear stage arrangement 31 is then installed in the appliance housing 2. The reinforcement frame 37 can be fastened to the motor housing 4 and/or the gear casing 32 using fewer than ten screws 39, and in particular fewer than six screws, but preferably only one screw. Advantageously the reinforcement frame 37 is clipped to the motor housing 4 and/or to the gear casing 32. Advantageously the electric motor-gear stage arrangement 31 is tested and rated prior to installation in the appliance housing 2.

A particularly advantageous electric-motor driven kitchen appliance 1, in particular an electric-motor driven single or multipurpose kitchen appliance, having an electric motor 3 and a gear stage 33, wherein the electric motor 3 has a motor housing 4 and the gear stage 33 has a gear casing 32, is characterized in that the motor housing 4 and the gear casing 32 are connected together with the aid of a bayonet lock 34. The motor housing 4 can be made from glass fiber reinforced plastic or by die-casting. The gear casing 32 can also be made from glass fiber reinforced plastic or by die-casting. The bayonet lock 34 has in particular a locking angle 46 of less than 180°, and in particular of less than 90°, but preferably of less than 45°. In one embodiment the electric motor 3 has a single direction of rotation 47 which operates in the closing direction of the bayonet lock 34 and causes the bayonet lock 34 to keep in place while the system is operating. Advantageously a torsionally rigid connection between a motor shaft 20 of the electric motor 3 and a drive shaft 75 of the gear stage 33 is produced with the aid of a worm gear pair 30. The worm gear pair 30 can comprise a motor-related gearing worm 27 and at least one drive-related worm gear 28, and preferably two drive-related worm gears, opposite the gearing worm 27. Advantageously the motor housing 4 and the gear casing 32 are additionally fixed together by a reinforcement frame 37. In one embodiment the bayonet lock 34 has an axis of rotation which for the most part coincides with the motor's axis of rotation 5. Advantageously the kitchen appliance 1 has a housing 2 in which the electric motor 3 connected to the gear stage 33 can be inserted.

A particularly advantageous electric motor has a first bayonet lock part 35 for the inventive kitchen appliance 1.

A particularly advantageous gear stage 33 has a second bayonet lock part 36 for a kitchen appliance 1.

A particularly advantageous method for assembling an electric-motor driven kitchen appliance 1, in particular the inventive electric-motor driven kitchen appliance 1, having an electric motor 3 and a gear stage 33, wherein the electric motor 3 has a motor housing 4 and the gear stage 33 has a gear casing 32, is characterized by the following method steps: Preassemble the electric motor 3 in the motor housing 4, preassemble the gear stage 33 in the gear casing 32, connect the motor housing 4 to the gear casing 32 with the aid of a bayonet lock 34, so that a motor shaft 20 of the electric motor 3 is connected in a torsionally rigid manner to a drive shaft 75. Advantageously the bayonet lock 34 is closed by rotating said lock largely about the motor shaft 20 and moving it a short distance.

A particularly advantageous electric-motor driven kitchen appliance 1, in particular an electric-motor driven single or multipurpose kitchen appliance, comprising a planetary gear set 54, and having at least one planet wheel 55 with a planet wheel axis 56 and a sun gear 49 having a sun gear axis 50, and an electric motor 3 having a motor shaft 20 which extends along an axis of rotation 5 of the motor, wherein the motor shaft 20 and the planetary gear set 54 with a connection 57 that transmits the rotation are coupled together, is characterized in that the connection 57 that transmits the rotation comprises a parallel shaft gearbox 58 with a first 59 and a second 60 spur wheel and/or a helical-bevel gearbox 65 with a first 63 and a second 64 bevel gear. In one embodiment the parallel shaft gearbox 58 or the helical-bevel gearbox 65 has a gear ratio in a range from 10 to 40, and in particular in a range from 20 to 30. In a development, the connection 57 that transmits the rotation comprises a worm gear pair 30 with a gearing worm 27 and a worm gear 28 or a cylindrical crossed helical gear 48 with a first 51 and a second 52 cylindrical crossed helical gear wheel, wherein the worm gear pair 30 or the cylindrical crossed helical gear 48 has a gear ratio in a range from 0.5 to 4, and in particular in a range from 1 to 2. The gearing worm 27 or the first cylindrical crossed helical gear wheel 51 can be located on the motor shaft 20. The sun gear 49 can have a sun gear shaft 53 on which a second bevel gear is located. In one embodiment, the respective drive shafts 75 of the worm gear pair 30, the respective drive shafts 76 of the cylindrical crossed helical gear 48 and the respective drive shafts 77 of the helical-bevel gearbox 65 are largely perpendicular to one another or the respective drive shafts 78 of the parallel shaft gearbox 58 are largely parallel to one another. The sun gear axis 50 can be largely perpendicular to and coplanar with the motor's axis of rotation 5. In a development, for the purpose of absorbing counter-forces the worm gear pair 30 has a mating gear 66 for a worm wheel, the cylindrical crossed helical gear 48 has a mating gear 67 for a spur wheel, and the helical-bevel gearbox 65 has a mating gear 68 for a bevel wheel, relative to which the gearing worm 27, the first cylindrical crossed helical gear wheel 51, and the first bevel gear 63, are opposite the worm gear 28, the second cylindrical crossed helical gear wheel 52 or the second bevel gear 64 respectively and engage with the gearing worm 27, the first cylindrical crossed helical gear wheel 51 or the first bevel gear 63. The planetary gear set 54 can have a ring gear 69 arranged coaxially to the sun gear 49. The ring gear 69 can be stationary and can be linked in a torsionally rigid manner to a housing 2 of the kitchen appliance 1. The ring gear 69 can be cone-shaped. The planet wheels 55 can be cone-shaped. In one embodiment, the planet wheel axis 56 and the sun gear axis 50 intersect at an angle of between 30° and 80°, and in particular at an angle of between 20° and 35°, but preferably at an angle of between 25° and 30°. Advantageously at least two and in particular at least three planet wheels 55 are provided. Advantageously the planet wheel 55 has a planet wheel axis 56 and the gear ratio between a rotation about the sun gear axis 50 and a rotation about the planet wheel axis 56 is in a range from 1:1 to 1:10, or in particular in a range from 1:2 to 1:5. The electric motor 3 can have a maximum nominal rotational frequency in a range from 8000 revolutions per minute to 20000 revolutions per minute, and in particular in a range from 10000 revolutions per minute to 15000 revolutions per minute. In a particular embodiment, the at least one planet wheel 55 has a holder 70 for an attachment 29, in particular a puree blender, mixer, shredder, kneader and/or cutter, a crusher or beater 74.

The invention relates to an electric motor-driven kitchen appliance 1, particularly a single or multipurpose electric motor-driven kitchen appliance, comprising an insertable electric motor-gear stage arrangement 31 which has an electric motor 3 having a motor housing 4 and a gear stage 33 having a gear case 32 fastened to said electric motor, and provides that the arrangement 31 comprises a removable reinforcement frame 37 arranged around the motor housing 4 and gear case 32. The invention also relates to a method for producing an electric-motor driven kitchen appliance 1 with the aid of a reinforcement frame 27. The invention is characterized in that the electric motor-gear stage arrangement 31 can be tested outside of the housing of the kitchen appliance 1 and produced in a cost-effective manner, being particularly torsionally rigid due to said removable reinforcement frame 37, thereby exhibiting operational reliability.

KEY TO REFERENCE NUMBERS

1 Kitchen appliance
2 Housing
3 Electric motor
4 Motor housing
5 Axis of rotation of motor
6 Rotor
7 Rotor coil
8 Fan wheel
9 Stator
10 Stator coil
11 End of winding
12 Intake ports
13 Outlets
14 First edge
15 Second edge
16 First flow channel
17 Second flow channel
18 Fan blades
19 Backing plate
20 Motor shaft
21 First plate surface
22 Second plate surface
23 Gearing element
24 Cooling wheel
25 Heat conduction section
26 Contact surface
27 Gearing worm
28 Worm gear
29 Attachment
30 Worm gear pair
31 Electric motor-gear stage arrangement
32 Gear casing
33 Gear stage
34 Bayonet lock 35 First bayonet lock part
36 Second bayonet lock part
37 Reinforcement frame
38 Connecting line
39 Bolts
40 Connection elements
41 Connection projections
42 Connection counter elements
43 Connection receivers
44 Metal section
45 Bolt flange
46 Locking angle
47 Direction of rotation
48 Cylindrical crossed helical gear
49 Sun gear
50 Sun gear axis
51 First cylindrical crossed helical gear wheel
52 Second cylindrical crossed helical gear wheel
53 Sun gear shaft
54 Planetary gear set
55 Planet wheel
56 Planet wheel axis
57 Connection that transmits the rotation
58 Parallel shaft gearbox
59 First spur wheel
60 Second spur wheel
61 First spur wheel shaft
62 Second spur wheel shaft
63 First bevel gear
64 Second bevel gear
65 Helical-bevel gearbox
66 Mating gear for worm wheel
67 Mating gear for spur wheel
68 Mating gear for bevel wheel
69 Ring gear
70 Holder
71 Cooling air
72 Heat transfer resistance
73 Heat conduction resistance
74 Beater
75 Drive shafts for worm gear pair 30
76 Drive shafts for cylindrical crossed helical gear 48
77 Drive shafts for helical-bevel gearbox 65
78 Drive shafts for parallel shaft gearbox 58
79 Casing cover
80 Appliance head
81 Attachment holder
L1 Length of outlets 13
L2 Length of fan wheel 8
L3, L4 Lengths
D1 Thickness of backing plate 19
D2 Wall thickness of cooling wheel 24
D3 Diameter of motor shaft 20
D4 Wall thickness of fan blades 18
D5 Diameter of cooling wheel 24
W1 Angle

The invention claimed is:

1. An electric motor-driven kitchen appliance comprising:
an appliance housing;
an electric motor having a motor housing;
a gear stage having a gear case fastened to the electric motor; and
a removable reinforcement frame connecting the motor housing and gear case,
wherein the removable reinforcement frame rigidly connects the motor housing and the gear case to the appliance housing such that a connection between the motor housing and the gear case provided by the removable reinforcement frame is torsionally rigid along a connecting line between the electric motor and the gear stage.

2. The kitchen appliance of claim 1, wherein the removable reinforcement frame surrounds the motor housing and the gear case.

3. The kitchen appliance of claim 1, wherein the connection is capable of withstanding torque values between about 3 Nm to about 100 Nm.

4. The kitchen appliance of claim 1, wherein the removable reinforcement frame includes one of a metal frame, a punch-formed metal frame, a pressed metal frame, and a die-cast metal frame.

5. The kitchen appliance of claim 1, further including a screw fastening the removable reinforcement frame to one of the gear casing and motor housing such that the one of the gear casing and the motor housing is fixed in position with respect to the removable reinforcement frame.

6. The kitchen appliance of claim 1, wherein one of the gear casing, the motor housing, and the reinforcement frame has connectors.

7. The kitchen appliance of claim 6, wherein the connectors include one of connection projections, an annular spring, connection counter elements, connection receivers, and an annular groove.

8. The kitchen appliance of claim 1, wherein the removable reinforcement frame includes one of a U-shaped section and an L-shaped metal section.

9. The kitchen appliance of claim 1, further including one of a puree blender, a mixer, a shredder, a kneader, a cutter, a crusher, a beater, a drink mixer, a slicer, a flour sifter, a juicer, and a meat grinder.

10. The kitchen appliance of claim 1, wherein one of the motor housing and the gear casing is one of a plastic and a glass fiber reinforced plastic.

11. The kitchen appliance of claim 1, further including a bolt flange connecting the gear casing and the motor housing.

12. The kitchen appliance of claim 1, where the gear stage includes a holder for an attachment.

13. The kitchen appliance of claim 1, wherein the removable reinforcement frame surrounds a perimeter of the motor housing and the gear case when the motor housing and the gear case are in an assembled state.

14. The kitchen appliance of claim 13, wherein the removable reinforcement frame includes a cutout corresponding to a shape of the perimeter of the motor housing and the gear case when the motor housing and the gear case are in an assembled state.

15. The kitchen appliance of claim 1, wherein one of the removable reinforcement frame, the motor housing, and the gear case includes a connection projection, and
wherein another of the removable reinforcement frame, the motor housing, and the gear case includes a connection receiver that receives the connection projection in an assembled state.

16. An electric motor-driven kitchen appliance comprising:
an appliance housing; and
an electric motor-gear stage arrangement connected to the appliance housing;
wherein the electric motor-gear stage arrangement includes:
an electric motor having a motor housing;
a gear stage having a gear case fastened to the electric motor; and
a removable reinforcement frame connecting the motor housing to the gear case in a torsionally rigid manner, wherein the removable reinforcement frame surrounds a perimeter of the motor housing and the gear case in an assembled state, and
wherein the removable reinforcement frame connects the motor housing and the gear case to the appliance housing.

17. The kitchen appliance of claim 16, wherein the removable reinforcement frame includes a cutout corresponding to a shape of the perimeter of the motor housing and the gear case when the motor housing and the gear case are in an assembled state.

18. The kitchen appliance of claim 16, wherein one of the removable reinforcement frame, the motor housing, and the gear case includes a connection projection, and
wherein another of the removable reinforcement frame, the motor housing, and the gear case includes a connection receiver that receives the connection projection in an assembled state.

19. The kitchen appliance of claim 18, further comprising:
a screw fastening the removable reinforcement frame to one of the gear casing and motor housing.

20. The kitchen appliance of claim 16, further comprising:
a screw fastening the removable reinforcement frame to one of the gear casing and motor housing such that the one of the gear casing and the motor housing is fixed in position with respect to the removable reinforcement frame.

21. The kitchen appliance of claim 16, wherein the removable reinforcement frame includes one of a U-shaped section and an L-shaped metal section.

22. The kitchen appliance of claim 16, wherein the removable reinforcement frame includes:
a perimeter portion surrounding the perimeter of the assembled motor housing and gear case; and
a cutout corresponding to a perimeter shape of the assembled motor housing and gear case such that a portion of the assembled motor housing and gear case are received in the cutout of the removable reinforcement frame in the assembled state,
wherein the removable reinforcement frame is secured to one of the motor housing and the gear case such that the one of the gear casing and the motor housing is fixed in position with respect to the removable reinforcement frame.

23. The kitchen appliance of claim 22, wherein one of the removable reinforcement frame and the motor housing includes a connection projection, and
wherein another of the removable reinforcement frame and the motor housing includes a connection receiver that receives the connection projection in an assembled state such that the motor housing is fixed in position with respect to the removable reinforcement frame.

24. The kitchen appliance of claim 22, wherein one of the removable reinforcement frame and the gear case includes a connection projection, and
wherein another of the removable reinforcement frame and the gear case includes a connection receiver that receives the connection projection in an assembled state such that the gear case is fixed in position with respect to the removable reinforcement frame.

25. The kitchen appliance of claim 22, wherein the perimeter portion of the removable reinforcement frame includes one of a U-shaped cross-section and an L-shaped cross-section.

26. The kitchen appliance of claim 25, wherein a part of the one of the U-shaped cross-section and the L-shaped cross-section of the removable reinforcement frame includes a connection projection, and
wherein the motor housing includes a connection receiver that receives the connection projection in an assembled state such that the motor housing is fixed in position with respect to the removable reinforcement frame.

27. The kitchen appliance of claim 25, wherein a part of the one of the U-shaped cross-section and the L-shaped cross-section of the removable reinforcement frame includes a connection projection, and
wherein the gear case includes a connection receiver that receives the connection projection in an assembled state such that the gear case is fixed in position with respect to the removable reinforcement frame.

28. A method for producing a kitchen appliance comprising: providing a housing with an electric motor and a motor housing;
providing a gear stage with a gear casing;
torsionally rigidly connecting the motor housing to the gear casing by coupling a drive shaft of the gear stage and a motor shaft of the motor to provide an electric motor-gear stage;
placing a reinforcement frame around the gear casing and the motor housing so that the gear casing is connected to the motor housing in a torsionally rigid manner; and
installing the electric motor-gear stage in an appliance housing.

29. The method of claim 28, wherein the placing of the reinforcement frame includes screwing the reinforcement frame to one of the motor housing and the gear casing with less than ten screws.

30. The method of claim 28, wherein the placing of the reinforcement frame includes clipping the reinforcement frame to one of the motor housing and the gear casing.

31. The method of claim 28, further comprising:
testing the electric motor-gear stage; and
rating the electric motor-gear stage, prior to installing the electric motor-gear stage in the appliance housing.

* * * * *